United States Patent [19]

Specker et al.

[11] Patent Number: 4,462,563
[45] Date of Patent: Jul. 31, 1984

[54] SIMPLE NONRESTRICTIVE ARM RESTRAINT SYSTEM

[75] Inventors: Lawrence J. Specker; Thomas J. Jennings, both of Dayton; Michael P. Connors, Beavercreek, all of Ohio

[73] Assignee: The United States of America as represented by the Secretary of the Air Force, Washington, D.C.

[21] Appl. No.: 433,597

[22] Filed: Oct. 8, 1982

[51] Int. Cl.³ .............................................. B64D 25/02
[52] U.S. Cl. ............................ 244/122 AG; 244/122 B
[58] Field of Search ....... 244/122 AG, 122 A, 122 B, 244/122 R

[56] References Cited

U.S. PATENT DOCUMENTS

| | | | |
|---|---|---|---|
| 2,940,701 | 6/1960 | Beem et al. | 244/122 AG |
| 3,074,669 | 1/1963 | Bohlin | 244/122 AG |
| 3,202,384 | 8/1965 | Martin | 244/122 AG |
| 3,502,073 | 3/1970 | Stanley | 128/134 |
| 3,957,231 | 5/1976 | Miller et al. | 244/122 AG |
| 4,179,086 | 12/1979 | Yamada | 244/122 AG |

FOREIGN PATENT DOCUMENTS 1456007 11/1976 United Kingdom ........ 244/122 AG

Primary Examiner—Trygve M. Blix
Assistant Examiner—Ivy M. Shum
Attorney, Agent, or Firm—Donald J. Singer; John R. Flanagan

[57] ABSTRACT

An improved arm restraint system for moving the arms of an ejection seat occupant to restrained positions along the sides of the occupant's torso upon initiation of emergency escape ejection of the seat and occupant from an aircraft includes a multistrap and guide ring arrangement wherein the elbow of the aircrewman is drawn tightly against the torso side through a direct interconnection therebetween and concurrently his hands/wrists are drawn to the ejection control of the seat.

3 Claims, 11 Drawing Figures

U.S. Patent   Jul. 31, 1984   Sheet 3 of 3   4,462,563

SIMPLE NONRESTRICTIVE ARM RESTRAINT SYSTEM

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to an arm restraint system and, more particularly, is concerned with a simple, non-restrictive system designed to allow unimpeded arm and body movement during normal aircraft operation, as well as protection for an aircrewman from arm flail injuries during high speed emergency ejection from the aircraft.

2. Description of the Prior Art

Ejection of aircrewmen from aircraft traveling at velocities above 375 KEAS (knots estimated air speed) has resulted in a windblast injury rate in excess of ten percent. At 500 KEAS, the probability of injury is nearly fifty percent. The injuries that are experienced range from joint derangements and long bone fractures to catastrophic extension of the cervical spine. Even where crewmen survive such injuries, they often need to undergo long recovery periods, and in case where there is joint disruption or nerve involvement, return to flight status may not be possible.

Voluntary action of the crewman cannot be relied upon to maintain his body members in their optimum positions for ejection. Therefore, various positioning and restraining devices have been developed for forcing his body members into those positions and confining them therein. Several devices known heretofore for positioning a crewman's body members in predetermined positions in relation to an ejection seat utilize some sort of tension lines or the like which are rendered operative to effect such positioning by the motion of the ejection seat and seat occupant relative to the aircraft. In the actuation of these tension lines, the work required for moving the occupant's body members to their ejection positions is derived from the propulsion means that effects seat ejection.

U.S. Patents to Bohlin, No. 3,074,669; Stanley, No. 3,502,073; Miller et al, No. 3,957,231; and Yamada, No. 4,179,086; and British Specification No. 1,456,007 to Martin all disclose positioning and restraining devices of this general design. The patents to Miller and Martin both disclose arm restraint systems which include, for each arm of an ejection seat occupant, a sleeve to which an elongated flexible tape or line is connected at two spaced points, one adjacent the wrist and the other between the shoulder and elbow. A guide ring may slide along the arm line, and another tension line is connected to the guide ring and also to the aircraft floor through a one-way snubber block. Upon ejection occurring, the tension line pulls on the guide ring causing the latter to begin sliding down the arm line from the elbow toward the wrist. In doing so, the guide ring pulls the arm line into a V-shape which simultaneously pulls the arm into a restrained position wherein the elbow is intended to be held against the side of the seat occupant's body and the wrist against the occupant's thigh.

However, neither the restraint system of Miller nor Martin provide any positive connection between the occupant's arm and body to ensure that arm flailing at the elbow cannot occur under some windblast conditions. Consequently, a need exists for improvement of arm restraint systems to provide greater assurance that arm flail and resulting injuries will most likely not occur.

SUMMARY OF THE INVENTION

The present invention provides an arm restraint system which is designed to satisfy the aforementioned needs. The system when activated pulls the elbow tightly to the chest or torso of the seat occupant and the hand of the occupant to the ejection control. A direct coupling or connection is maintained between the occupant's elbow and torso at all times which ensures positive guidance of the elbow to, and retention at, the desired position during ejection. By so doing, the present invention should significantly reduce the likelihood of occurrence of arm flail injuries, even as mean ejection airspeed for Air Force aircraft continues to increase.

Accordingly, the present invention is directed to an improved arm restraint system for moving the arms of an ejection seat occupant to restrained positions along the sides of the occupant's torso upon initiation of emergency escape from an aircraft by means of an ejection seat or the like. The improved arm restraint system includes, for each arm of the occupant, (a) first means for pulling the corresponding arm, at the wrist thereof, toward the restrained position, and (b) second means for pulling the arm, at the elbow thereof, toward the restrained position, with (c) the first and second means being interconnected together and to a fixed location of the aircraft so as to cause the wrist and elbow of the arm to be pulled simultaneously toward the restrained position during ejection of the seat and occupant from the aircraft.

More particularly, the first means includes a flexible strap connected at first and second fixed points to the corresponding arm respectively adjacent to the wrist and elbow thereof, and a movable guide ring adapted to slide along the fixed strap between the first and second points. The second means includes a fixed guide ring connected at a third fixed point to the corresponding arm located adjacent to the second fixed point and thereby the elbow of the arm, and a movable flexible strap connected at one end to the movable guide ring, extending through the fixed guide ring, and connected at the other end to a fourth fixed point located on the corresponding side of the occupant's torso. Further, the first means includes a second flexible strap attached to the movable guide ring for interconnecting the fixed strap of the first means and movable strap of the second means to the fixed location of the aircraft. As the seat and occupant are ejected, the interconnecting strap pulls the movable guide ring causing it to slide away from the second fixed point and toward the first fixed point. Such movement of the guide ring causes the fixed strap and corresponding arm at the wrist thereof to be pulled toward the corresponding side of the occupant's torso, and, simultaneously, the movable strap to be pulled through the fixed guide ring which, in turn, pulls the corresponding arm at the elbow thereof inwardly toward the corresponding torso side of the occupant.

DETAILED DESCRIPTION OF THE INVENTION

Figure 4:
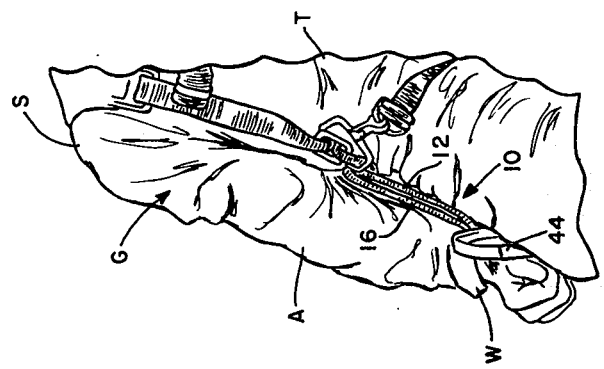
FIG. 4 is a view similar to that of FIG. 3, but showing the condition of the system when the aircrewman's arm has reached the desired restrained position where his elbow is tightly held against the side of his torso and his hand on the ejection seat control.
Figure 3:
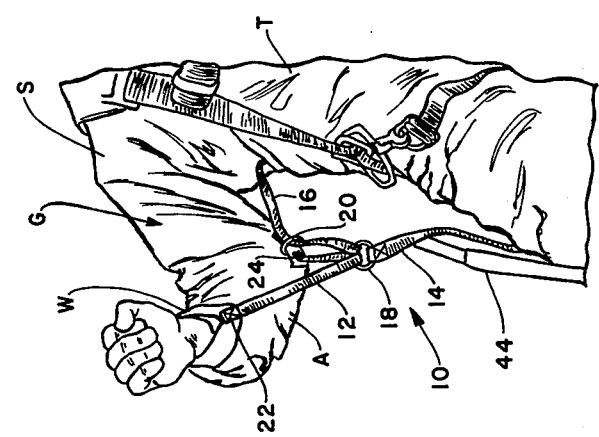
FIG. 3 is a view similar to that of FIG. 2, but showing the condition of the system where the aircrewman's arm is being pulled toward the side of his torso as ejection continues.
Figure 1:
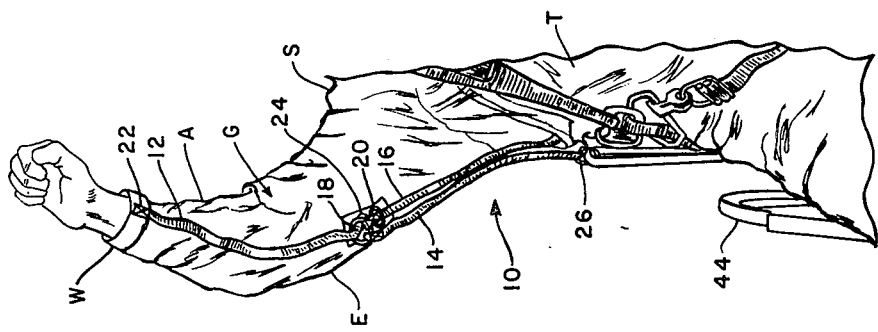
FIG. 1 is a front fragmentary view of an aircrewman wearing the preferred form of the arm restraint system of the present invention, showing the right portion of the system in its normal, stored condition during nonuse.
Figure 5:
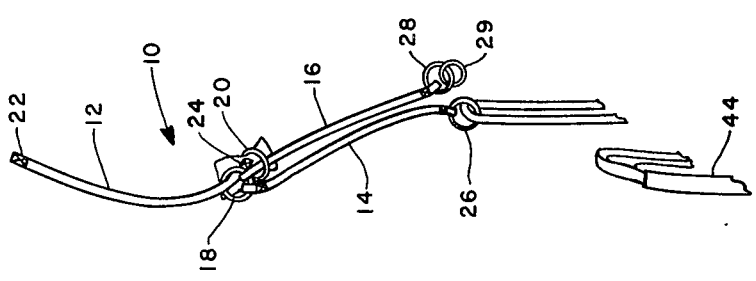
FIG. 5 is a schematic representation of the right portion of the arm restraint system showing the system in its normal, stored condition of FIG. 1.

Referring now to the drawings, and more particularly to FIGS. 1 and 5, there is shown the right portion of the improved arm restraint system, generally designated 10, which comprises the preferred embodiment of the present invention. For an understanding of the improved system 10, it is unnecessary to illustrate and describe its left portion since such is identical to the right portion illustrated in FIGS. 1-10 and to be described in detail hereinafter.

In FIG. 1, the right arm A of the aircrewman is shown in a raised, extended position in order to expose to view the right portion of the restraint system 10 in its normal, stored condition during its period of nonuse. Also, such position of the arm demonstrates the range of movement the aircrewman possesses during periods of nonuse of the system 10.

Basically, the improved arm restraint system 10 is a multistrap type system which is stored on the sleeves of an outermost garment G worn by the aircrewman. The garment may be the aircrewman's jacket or a special garment comprising a pair of sleeves connected to the aircrewman's parachute harness. As shown in FIGS. 1 and 4, the restraint system is comprised of three elongated members or straps 12, 14, 16 and a pair of guide members or rings 18, 20.

The first strap 12 runs the length of the ulnar side of the garment forearm. The opposite ends of the first strap 12 are sewn to the garment G at points 22, 24, respectively, with one point 22 being at the end of the garment arm adjacent the wrist W of the aircrewman and the other point 24 located on the garment arm between his elbow E and shoulder S. The garment G is reinforced at these attachment points to prevent tearout upon deployment of the restraint system 10.

The first guide ring 18 is installed on the first strap 12 in such manner as to allow the guide ring to freely slide along the first strap 12 and to thereby traverse the entire length of the first strap 12 during deployment of the system 10. The first guide ring 18 should be large enough in diameter to freely permit this sliding motion. The stowed position of the ring 18 is at the end of the strap 12 closest to the elbow E.

Figure 9:
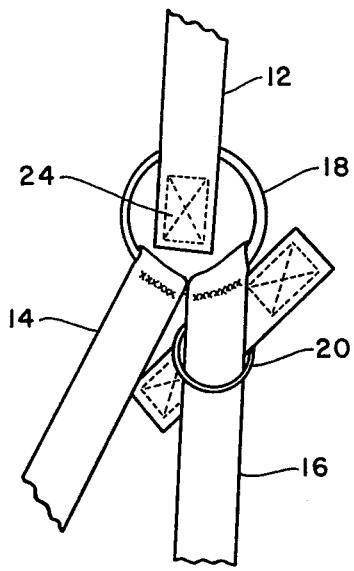
FIG. 9 is a fragmentary enlarged view of a portion of the arm restraint system attached to the aircrewman's garment adjacent to his elbow.
Figure 10:
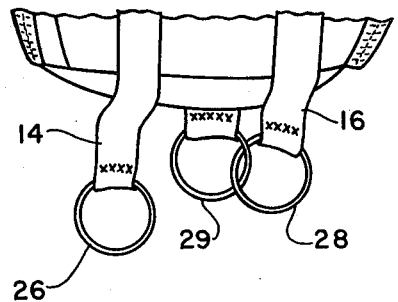
FIG. 10 is a fragmentary enlarged view of a portion of the arm restraint system which is attached to the aircrewman's harness at his torso and another portion attachable to a retracting strap shown in FIG. 11.

The second and third straps 14, 16 are each attached at one end to the first guide ring 18 (see FIG. 9). The second strap 14 (see FIG. 10) has a connecting ring 26 sewn to its other opposite end. The connecting ring 26 facilitates attachment of the arm restraint system 10 to a conventional aircraft attachment assembly of FIG. 11 which will be described later. The third strap 16 runs along the inner aspect of the aircrewman's arm A from its attachment at its one end to the first guide ring 18, through a second guide ring 20, and down the torso T of the aircrewman to a location of attachment of its other opposite end. The second guide ring 20 is fixed to the garment G (see FIG. 9) just above the medial aspect of the elbow E adjacent to the second point 24 of attachment of the first strap 12 to the garment. The garment is also reinforced at the attachment point of the second guide ring 20. At the opposite end of the third strap 16 is sewn a snap ring connector 28 (see FIG. 10) which allows the third strap to be connected to a suitable anchoring location, such as a ring 29 sewn on the parachute harness at the right side of the aircrewman's torso T.

The length of the third strap 16 should be approximately equal to the length of the first strap 12. This will allow the aircrewman's elbow E to be pulled tightly against his torso T when the restraint system 10 is deployed. Also the straps 12, 14, 16 should be sewn into the garment with "breakaway" stitches. They will then be stored along the garment arm and torso until needed. However the last several inches of the length of the second and third straps 14, 16, from connecting rings 26, 28 toward the axilla, should be attached by Velcro material to the garment to allow the aircrewman to fix the restraint system to his harness prior to aircraft ingress.

Figure 11:
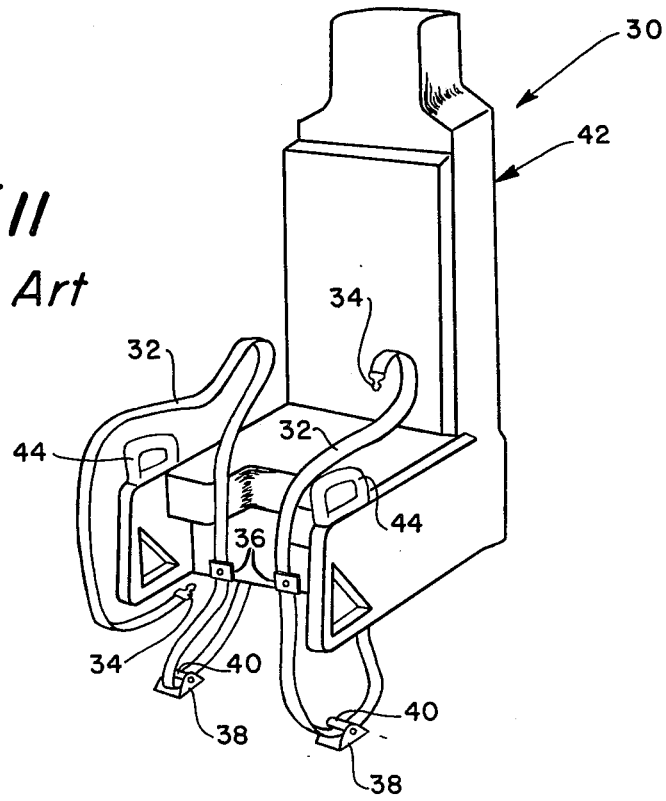
FIG. 11 is a perspective view of the prior art ejection seat, retraction straps, snubbers and locking pins with which the arm restraint system of the present invention is integrated.

The prior art aircraft attachment assembly, generally designated 30, to which the arm restraint system is attached is shown in FIG. 11. The assembly 30 includes arm restraint retraction lines 32 with locking pins 34, snubber units 36, and shear fittings 38 secured to the aircraft floor. The retraction lines 32 are routed by the aircrewman through connecting ring 26 of the restraint system 10 and then he inserts the locking pins 34 at the end of the lines 32 into the snubber units 36. The other ends of the retraction lines 32 had been previously routed through the snubber units 36 and shear pins 40 of the shear fittings 38 on the aircraft floor, to attachment locations on the bottom of the ejection seat 42.

When the seat 42 is ejected, the slack in the restraint system 10 is taken up by the upward travel of the seat, pulling the second straps 14 of the system on the aircrewman's garment. When the restraint system 10 has been fully deployed, the tension in the retraction lines 32 connected to the second straps 14 will cause the shear pins 40 to fail. The locking pins 34 can be released manually as in emergency egress or seat/man separation. All of the above-described components of the aircraft attachment assembly 30 of FIG. 11 have been in operation for the past two decades in connection with a leg restraint system.

An exemplary donning and deployment sequence for the improved arm restraint system 10 is as follows. First, the aircrewman dons the parachute harness with a life preserver and the anchoring ring 29 attached thereto. Next, the aircrewman pulls the last several inches of the second and third straps 14, 16 loose from his outer garment which portions were attached thereto by strips of Velcro material. Next, he attaches the snap ring connector 28 of the third strap 16 to the anchoring ring 29. Then, the aircrewman enters the aircraft and occupies the ejection seat 42. Once seated, he pulls the retraction lines 32 through the connecting rings 26 on the second straps 14 of the restraint system 10 and inserts their locking pins 34 into the snubber units 36.

Should an emergency escape situation arise during aircraft operation, the aircrewman will initiate escape in the normal manner by causing actuation of the seat ejection mechanism (not shown). As the seat 42 starts up its ejection rails (not shown), its upward motion, in turn, moves the aircrewman occupant, and the restraint system 10 that he is wearing, in an upward direction away from the aircraft floor. The slack in the retraction lines 32 which interconnect the second straps 14 and the aircraft floor is taken up through the snubber units 36 mounted on the seat 42.

Figure 2:
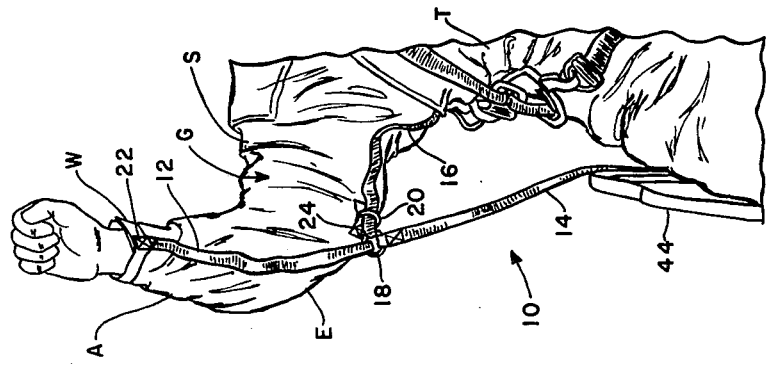
FIG. 2 is a view similar to that of FIG. 1, but showing the condition of the system immediately after initiation of ejection wherein the straps are beginning to be pulled loose from the aircrewman's garment.
Figure 6:
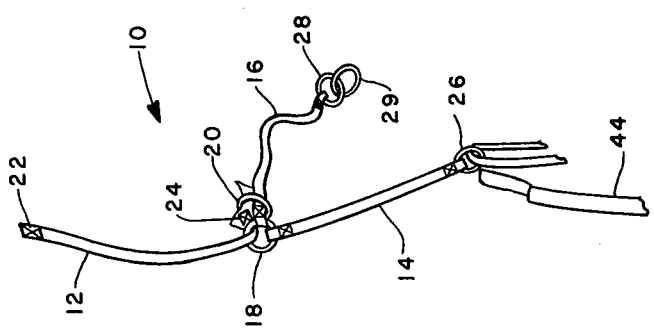
FIG. 6 is another schematic representation of the system showing it in an initial actuated condition corresponding to that of FIG. 2.

Tension in the retraction lines 32 develops which enables the second straps 14 to pull loose from the aircrewman's garment. This action is shown in FIGS. 2 and 6.

As ejection of the seat 42 and its occupant continue, the second strap 14 pulls the first guide ring 18 causing it to move away from the second fixed point 24 and second guide ring 20 and toward the first fixed point 22. This action occurs in the left and right arms simultaneously. Such movement of the first guide ring 18 pulls the third strap 16 through stationarily-fixed second guide ring 20 and down along the length of the first strap 12. As the third strap 16 is so pulled, its extent interconnecting the second guiding ring 20 and the elbow of the aircrewman's torso is shortened, as is readily apparent in comparing FIGS. 7 and 8. In such manner, the aircrewman's elbow is drawn closer to his torso. This action can be seen in comparing FIGS. 3 and 4.

Figure 8:
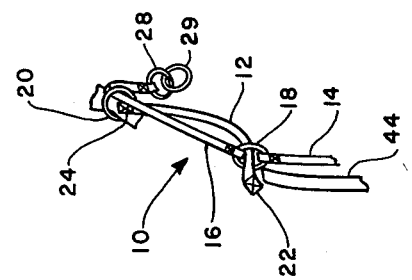
FIG. 8 is another schematic representation of the system showing it in a fully deployed condition corresponding to that of FIG. 4.
Figure 7:
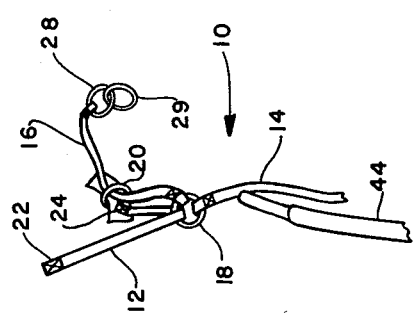
FIG. 7 is another schematic representation of the system showing it in an advanced actuated condition corresponding to that of FIG. 3.

After the first guiding ring 18 and third strap 16 have completely traversed the length of the first strap 12, such as seen in the fully deployed position of the restraint system 10 in FIGS. 4 and 8, the connecting rings 26 will have reached the snubber units 36 and the aircrewman's elbow and hand/wrist will be at their desired restrained positions at the sides of his torso. Specifically, the aircrewman's hand will be at the ejection control 44 on the seat 42.

The improved arm restraint system of the present invention is unique in its simplicity and ease of integration into Air Force systems. It is preferably incorporated in the outermost garment of the aircrewmember eliminating the requirement of complicated pre-flight hookups. When activated for deployment, the aircrewman's elbow is pulled tightly to his chest or torso and his hand to the ejection control. The likelihood of windblast flailing injuries to the arm and forearm should be substantially reduced by the improved system 10.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. An improved arm restraint system for moving the arms of an ejection seat occupant to restrained positions along the sides of the occupant's torso upon initiation of emergency escape ejection of the seat and occupant from an aircraft, comprising, for each arm of the occupant:

(a) first means for pulling the corresponding arm, at the wrist thereof, toward said restrained position, said first means including a fixed flexible strap connected at first and second fixed points to the corresponding arm respectively adjacent to the wrist and elbow thereof and a movable guide ring adapted to slide along said fixed strap between said first and second points and being interconnected to a fixed location on said aircraft; and (b) second means for pulling said arm, at the elbow thereof, toward said restrained position, said second means including a fixed guide ring connected at a third fixed point to the corresponding arm located adjacent to said second fixed point and thereby the elbow of said arm and a movable flexible strap connected at one end to said movable guide ring of said first means, extending through said fixed guide ring, and interconnected at the other end to a fourth fixed point located on the corresponding side of the occupant's torso;

(c) said connection of said movable guide ring of said first means and said movable flexible strap of said second means together and with said fixed location on said aircraft and with said fixed point on the side of the occupant's torso through said fixed guide ring of said second means causing the wrist and elbow of said arm to be pulled simultaneously toward said restrained position during ejection of said seat and occupant from said aircraft.

2. The arm restraint system as recited in claim 1, wherein said first means further includes a second flexible strap attached to said movable guide ring for interconnecting said fixed strap of said first means and said movable strap of said second means to the fixed location on the aircraft, said second flexible strap being effective, as said seat is ejected, to pull said movable guide ring causing it to slide away from said second fixed point and toward said first fixed point such that said fixed strap and corresponding arm at the wrist thereof are pulled toward the corresponding side of the occupant's torso, and, simultaneously, said movable strap is pulled through said fixed guide ring which pulls the corresponding arm at the elbow thereof inwardly toward the corresponding torso side of the occupant.

3. In an arm restraint system for moving the arms of an ejection seat occupant to restrained positions along the sides of the occupant's torso upon initiation of emergency escape ejection of the seat and occupant from an aircraft, said arm restraint system including, for each arm of the occupant, a first elongated flexible member connected at first and second fixed points to the corresponding arm, said first and second points being respectively adjacent to the wrist and elbow of the arm, a first guide member adapted to slide along said first flexible member between said first and second fixed points, and a second elongated flexible member interconnecting said first guide member and a fixed location on said aircraft such that, as said seat and its occupant are ejected from said aircraft, said second flexible member pulls said first guide member causing the latter to slide away from said second fixed point and toward said first fixed point and concurrently pull said first flexible member and corresponding arm at the wrist thereof toward the corresponding side of the occupant's torso to said restrained position, the improvement comprising:

(a) a second guide member connected at a third fixed point to the corresponding arm, said third point being located adjacent to said second fixed point and thereby the elbow of the corresponding arm; and (b) a third elongated flexible member connected at one end to said first guide member, extending through said second guide member, and connected at the other end to a fourth fixed point being located at the side of the occupant's torso such that as said first guide member is pulled by said second flexible member, causing said first guide member to move away from said second fixed point, said first guide member also moves away from said second guide member and pulls said third flexible member through said second guide member so as to pull the corresponding arm at the elbow thereof inwardly toward the corresponding side of the occupant's torso to said restrained position simultaneously as the same arm is being pulled at the wrist thereof toward the same torso side to said restrained position.

* * * * *